United States Patent
Choi

(10) Patent No.: US 8,340,513 B2
(45) Date of Patent: Dec. 25, 2012

(54) CAMERA AND METHOD FOR PERFORMING AUTO-FOCUSING

(75) Inventor: Woo-Seok Choi, Suwon-Si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/974,471

(22) Filed: Dec. 21, 2010

(65) Prior Publication Data

US 2011/0150445 A1    Jun. 23, 2011

(30) Foreign Application Priority Data

Dec. 22, 2009    (KR) .................. 10-2009-0129047

(51) Int. Cl.
*G03B 13/36* (2006.01)

(52) U.S. Cl. ...................................... 396/125

(58) Field of Classification Search ............... 396/104, 396/125–128
See application file for complete search history.

(56) References Cited

U.S. PATENT DOCUMENTS

| 5,597,999 A * | 1/1997 | Kinba et al. ............. 250/201.7 |
| 6,941,068 B2 * | 9/2005 | Matsuda ..................... 396/91 |
| 7,469,098 B2 * | 12/2008 | Ito ............................ 396/104 |
| 7,830,445 B2 * | 11/2010 | Kawahara ................. 348/345 |

FOREIGN PATENT DOCUMENTS

| JP | 09-184972 | 7/1997 |
| JP | 2009-036987 | 2/2009 |

* cited by examiner

*Primary Examiner* — W. B. Perkey
(74) *Attorney, Agent, or Firm* — The Farrell Law Firm, P.C.

(57) ABSTRACT

A camera and a method for performing auto-focusing applying thereto are provided. The camera adjusts a focus using two auto-focusing methods if specific photographing conditions are satisfied.

18 Claims, 15 Drawing Sheets

CAMERA AND METHOD FOR PERFORMING AUTO-FOCUSING

CROSS-REFERENCE TO RELATED APPLICATIONS

This application claims priority from Korean Patent Application No. 10-2009-0129047, filed in the Korean Intellectual Property Office on Dec. 22, 2009, the disclosure of which is incorporated herein by reference.

BACKGROUND OF THE INVENTION

1. Field of the Invention

Aspects of the exemplary embodiments relate to a camera and a method for performing auto-focusing, and more particularly, to a camera performs auto-focusing without a particular manipulation and a method for performing auto-focusing applying thereto.

2. Description of the Related Art

Recently, as multimedia apparatuses and the Internet service are widely distributed and used, many users store photographic images in their multimedia apparatuses or share the photographic images with others by uploading them on Internet blogs. Accordingly, the number of people who own a camera is increasing each year.

One of many features provided by a recent camera is an auto-focusing (AF) function that automatically adjusts a focal point. In general, a contrast method or a phase difference detection method is employed by an AF apparatus.

If the phase difference detection method is used, a focal point may be adjusted in a relatively short period of time, but an exclusive detection apparatus and an additional optical system for leading a pencil of light for detecting a focal point are required, thereby increasing the cost of manufacturing and the size of camera. The phase difference detection method is generally used for a digital single-lens reflex (DSLR) camera.

On the other hand, the contrast method does not require a separate space and thus, is generally employed for a small-scale compact camera. However, the contrast method cannot directly estimate deviation (defocus) of focus detection status and thus, a plurality of measurements are required. Therefore, it takes a relatively longer period of time to detect a focal point.

Accordingly, there is a need for a method for auto-focusing which does not require a separate space and detects a focal point in a short period of time.

SUMMARY OF THE INVENTION

Aspects of some embodiments of the invention may relate to a camera which can adjust a focal point using two auto-focusing detection methods when various photographing conditions are satisfied and a method for auto-focusing applying thereto.

A camera, according to one embodiment, may include a first auto-focusing unit which performs auto-focusing using a first method, a second auto-focusing unit which performs auto-focusing using a second method, and a controlling unit which may control a focus using both the first auto-focusing unit and the second auto-focusing unit.

A method for performing auto-focusing, according to an embodiment of the invention, may include determining whether specific conditions are satisfied and if specific conditions are satisfied, adjusting a focus using both a first auto-focusing method and a second auto-focusing method.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
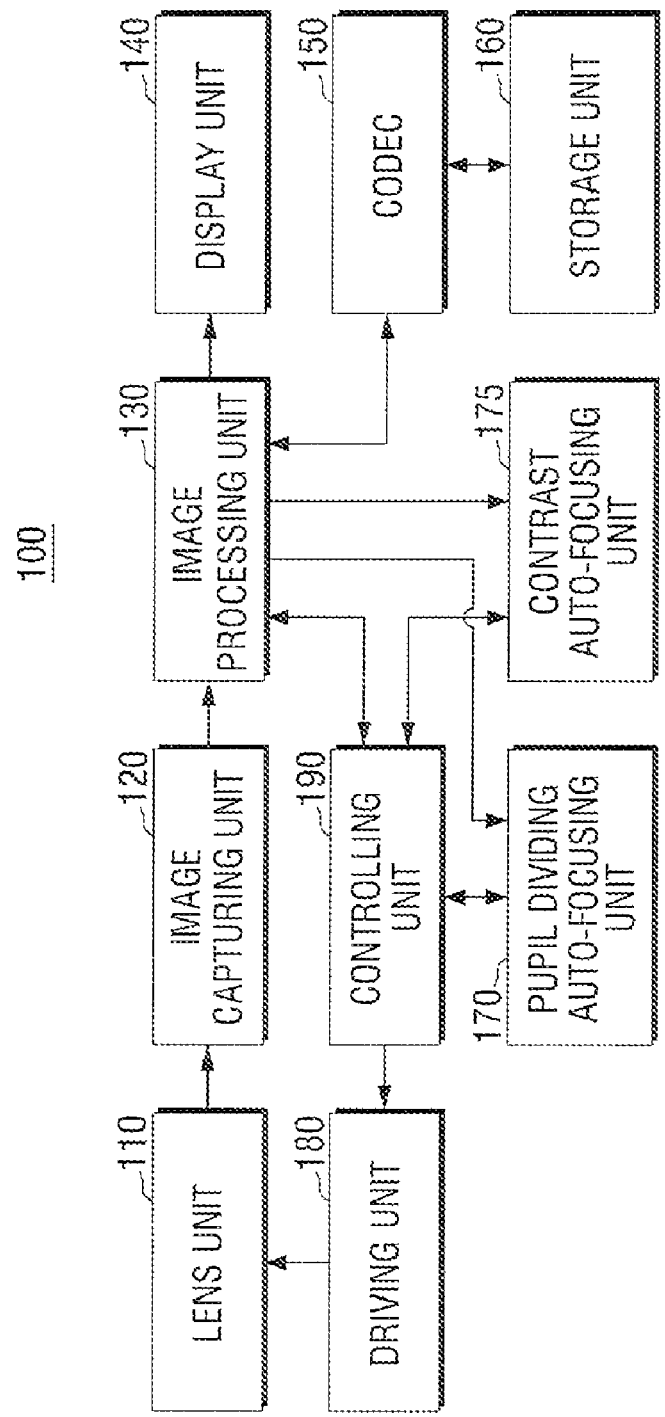
FIG. 1 is a block diagram illustrating a camera in detail according to an embodiment of the invention.

Certain embodiments of the invention are described in greater detail below with reference to the accompanying drawings.

In the following description, like drawing reference numerals are used for like elements, even in different drawings. The matters defined in the description, such as detailed construction and elements, are provided to assist in a comprehensive understanding of various embodiments. However, other embodiments can be practiced without those specifically defined matters. Also, well-known functions or constructions are not described in detail since they would obscure the application with unnecessary detail.

FIG. 1 is a block diagram illustrating a camera 100 in detail according to an embodiment of the invention. As illustrated in FIG. 1, the camera may comprise a lens unit 110, an image capturing unit 120, an image processing unit 130, a display unit 140, a codec 150, a storage unit 160, a pupil dividing auto-focusing unit 170, a contrast auto-focusing unit 175, a driving unit 180, and a controlling unit 190.

The lens unit 110 may collect light from a subject and form an image on an image capturing unit 120. The lens unit 110 may include a plurality of lenses and the lenses may form an optical group according to their respective functions. The lens unit 110 can change the location of a lens to adjust a focal point according to a driving signal of the driving unit 180.

The image capturing unit 120 may photoelectrically convert light entering through a lens into an electric signal and perform signal processing on the electric signal. The image capturing unit 120 may include a pixel and an AD converter. Each pixel outputs an image signal in an analog form, and the AD converter converts the analog image signal into a digital image signal and outputs the digital image signal. In addition, each pixel of the image capturing unit 120 may include a charge-coupled device (CCD) or a complementary metal oxide semiconductor (CMOS) optical sensor. A pixel may read an optical image in a rolling shutter or a global shutter method.

The image processing unit 130 may perform signal-processing on an image input from the image capturing unit 120 and transmit the processed image signal to the display unit 140. In addition, the image processing unit 130 may output the processed image signal to the codec 150. The image processing unit 130 may perform digital zooming, auto white balance (AWB), and other processing known in the art on an image signal output from the image capturing unit 120.

The display unit 140 may display an image received from the image processing unit 130. A user may check an image to be photographed by viewing an image displayed on the display unit 140.

The codec 150 may encode an image signal received from the image processing unit 130 and transmit the encoded image signal to the storage unit 160. In addition, the codec 150 may decode an encoded image signal stored in the storage unit 160 and transmit the decoded image signal to the image processing unit 130.

The storage unit 160 may store an image photographed by the image capturing unit 120 in a compressed form. The storage unit 160 may be embodied as a non-volatile memory, a hard disk, or the like.

The pupil dividing auto-focusing unit 170 may detect a focal point using a pupil dividing method. The pupil dividing method may include dividing a pencil of light ray in time sequences, dividing a pencil of light ray using a micro lens, and/or dividing a pencil of light ray using two holes. For example, the method of dividing a pencil of light ray using two hole apertures will be explained in detail with reference to FIG. 5 to FIG. 10B.

The pupil dividing method may detect a focal point using a photographing image sensor, and thus does not require an extra sensor for auto-focusing. Therefore, the pupil dividing method may perform auto-focusing with a relatively low cost and small space in a short period of time. However, in the pupil dividing method, if an angle of view is large (for example, in a wide mode) or the amount of light is small, the accuracy of auto-focusing may decrease. In addition, the pupil dividing method may have poor auto-focusing accuracy near an area where a focal point is in focus (an on-focus area). For example, the pupil dividing method may detect an on-focus area within a specific range in a short period of time when an angle of view is small (for example, in a tele mode), the amount of light is large, and the amount of defocus is large. Herein, the specific range represents a range where the amount of defocus is below a specified amount of defocus. Therefore, a pupil dividing auto-focusing unit 170 using the pupil dividing method may perform auto-focusing in a short period of time out of the specific range (for example, in a range where the amount of defocus exceeds the critical amount of defocus), but may not perform auto-focusing accurately within the specific range (for example, in a range where the amount of defocus is below the critical amount of defocus).

The pupil dividing auto-focusing unit 170 may also transmit information regarding auto-focusing to the controlling unit 190. The information regarding auto-focusing may include auto-focusing information detected by the auto-focusing unit 170 and includes information regarding a focal point.

The contrast auto-focusing unit 175 may perform auto-focusing using a contrast method. The contrast method may involve calculating the contrast value of an image processed by the image processing unit 130 and detecting a location using the highest contrast value as an on-focus location. Contrast of a photographed image may be calculated by moving the location of a lens at predetermined intervals. Although the contrast method may have high auto-focusing accuracy, it requires a long period of time to perform auto-focusing. In addition, the contrast auto-focusing unit 175 may transmit information regarding auto-focusing including information regarding a focal point and the calculated contrast value to the controlling unit 190.

The driving unit 180 may move lenses constituting the lens unit 110, according to a driving signal received from the controlling unit 190, to adjust a focal point. The driving unit 180 may be embodied using a motor and a bearing. For example, the driving unit 180 may control the movement of the lenses constituting the lens unit 110 using a driving motor in an x-axis direction and a driving motor in a y-axis direction. In other embodiments, the driving unit 180 may move the lenses by a driving motor using a sliding bearing or a rolling bearing.

The controlling unit 190 may generate a driving signal based on information received regarding auto-focusing. The controlling unit 190 may output the generated driving signal to the driving unit 180. If certain conditions are satisfied, the controlling unit 190 may generate a driving signal that may control to adjust a focal point using both the pupil dividing auto-focusing unit 170 and the contrast auto-focusing unit 175. In some embodiments, the certain conditions may include that an angle of view is below a specified angle of view and that the amount of entering light exceeds a specified amount of light. The specified angle of view may represent the largest angle of view for detecting a focal point beyond a specific accuracy when the pupil dividing method is used. The pupil dividing method may be used when the angle of view is below the specified angle of view. The specified amount of light may represent the smallest amount of light for detecting a focal point beyond a specific accuracy when the pupil dividing method is used. The pupil dividing method may be used when the amount of light is above the specified amount of light.

Depending on conditions, the controlling unit 190 may control to adjust a focus using the pupil dividing auto-focusing unit 170 and the contrast auto-focusing unit 175. If specific conditions are not satisfied, the controlling unit 190 may control to adjust a focus using only the contrast auto-focusing method 175.

For example, if specific conditions are satisfied, the controlling unit 190 controls to adjust a focus to be within a specific range using the pupil dividing auto-focusing unit 170 and then controls to adjust a focus minutely using the contrast auto-focusing unit 175. The controlling unit 190 may control to adjust a focus using the pupil dividing auto-focusing unit 170 until the focus enters into a specific range. If the focus enters into the specific range, the controlling unit 190 controls to adjust a focus using the contrast auto-focusing unit 175.

Figure 2:
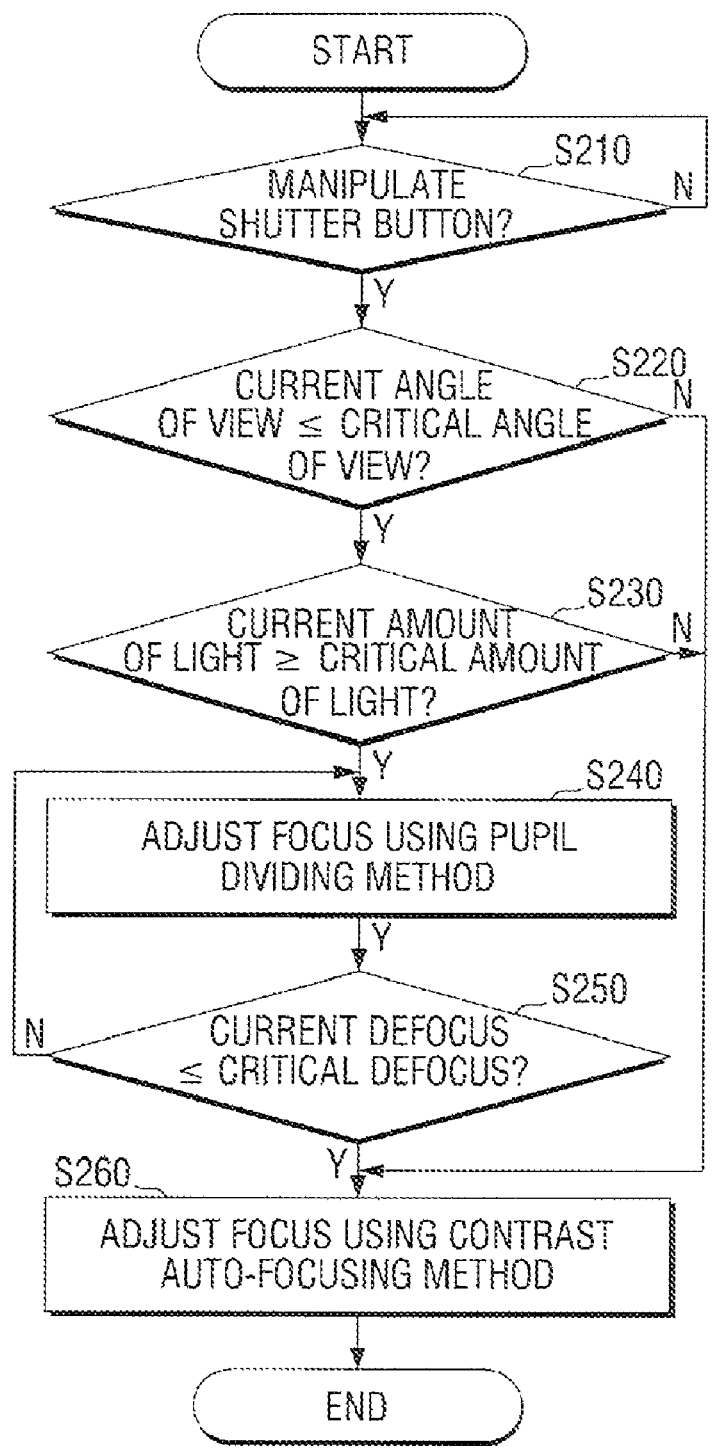
FIG. 2 is a flowchart of a method for auto-focusing according to an embodiment of the invention.

Hereinafter, a method for auto-focusing will be explained in detail with reference to FIG. 2.

The camera 100 may determine whether a shutter button is manipulated (S210). If the shutter button is pressed (S210—Y), the camera may determine whether a current angle of view is below a specified angle of view (S220). As described, the specified angle of view may be the largest angle of view for detecting a focal point beyond a specific accuracy when the pupil dividing method is used. The pupil dividing method may be used when the angle is below the specified angle of view. Accordingly, if the current angle of view exceeds the specified angle of view (S220—N), the camera 100 may adjust a focus using the contrast auto-focusing method (S260).

If the current angle of view is below the specified angle of view (S220—Y), the camera 100 may determine whether a current amount of light exceeds a specified amount of light (S230). As described above, the specified amount of light may be the smallest amount of light for detecting a focal point beyond a specific accuracy when the pupil dividing method is used. The pupil dividing method may be used when the amount of light is above the specified amount of light. Accordingly, if the current amount of light is below the specified amount of light (S230—N), the camera 100 may adjust a focus using the contrast auto-focusing method (S260).

If the current amount of light exceeds the specified amount of light (S230—Y), the camera 100 may determine that specific conditions are satisfied and adjust a focus using the pupil dividing auto-focusing method (S240).

The camera 100 may determine whether a current amount of defocus is below a specified amount of defocus (S250). If it is determined that the current amount of defocus exceeds the specific amount of defocus (S250—N), the camera 100 may adjust a focus using the pupil dividing method (S240). The specified amount of defocus may be the lowest amount of defocus for detecting a focus beyond a specific accuracy when the pupil dividing method is used. The camera 100 may adjusts a focus using the pupil dividing method until the focus enters into a specific range. If the current amount of defocus is below the specified amount of defocus (S250—Y), the camera 100 may adjust a focus minutely using the contrast method (S260).

The speed of detecting a focus by the pupil dividing auto-focusing unit 170 may be faster than that of the contrast auto-focusing unit 175 and thus, the camera 100 uses the pupil dividing auto-focusing unit 170 out of a specific range and uses the contrast auto-focusing unit 175 within the specific range. Therefore, the camera 100 may reduce overall time for adjusting a focus in comparison with when a focus is adjusted using only the contrast auto-focusing unit 175.

Figure 3:
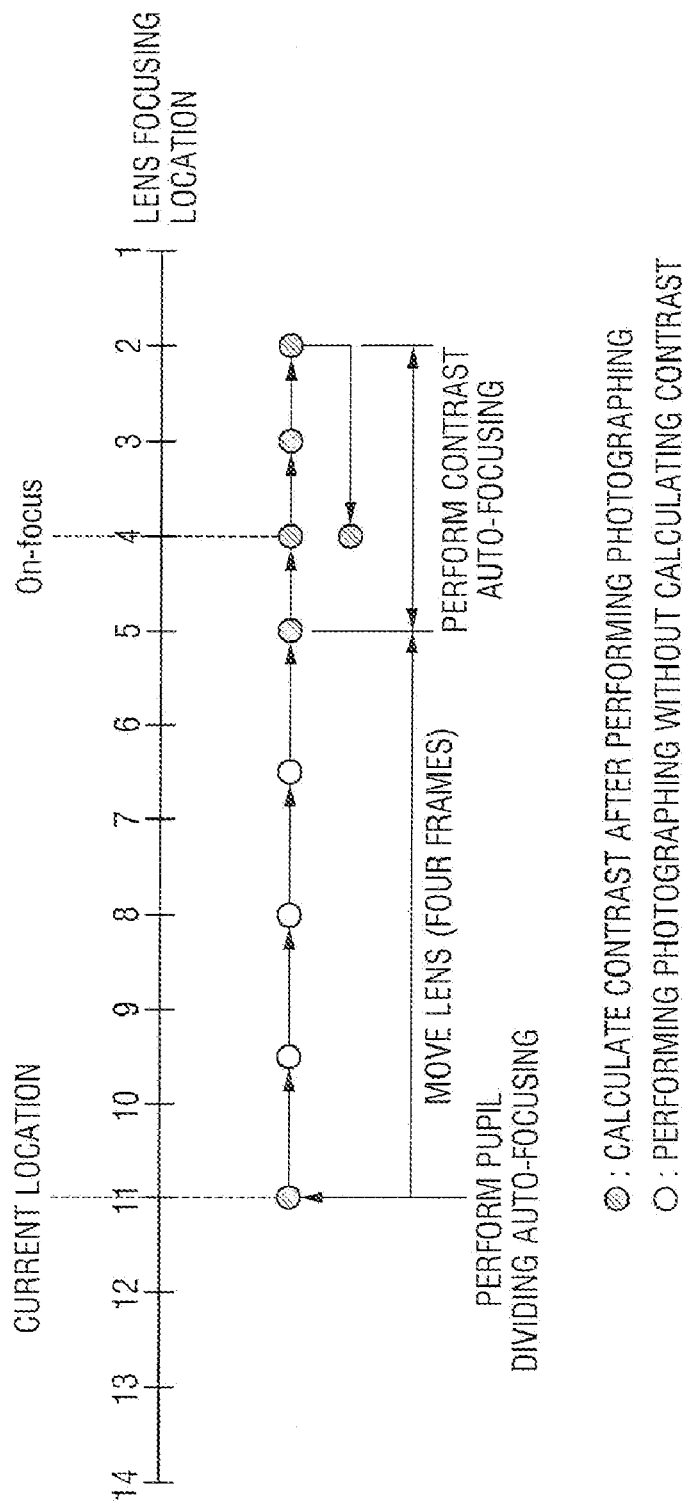
FIG. 3 is a view illustrating a focus adjusting path of a lens unit when a pupil dividing method and a contrast method are used together according to an embodiment of the invention.

FIG. 3 is a view illustrating a focus adjusting path of the lens unit 110 when a pupil dividing method and a contrast method are used together according to an embodiment of the invention.

In the example presented in FIG. 3, the location of the current focus of the lens unit 110 is number 11, and the location of on-focus (that is, location in focus) is number 4. If a user presses a shutter button, the camera 100 performs auto-focusing using the pupil dividing method at a current location. Subsequently, the camera 100 detects a focal point using the pupil dividing method. In this case, the camera 100 moves the location of the focus of the lens unit 110 until the amount of defocus below the specified amount of defocus at number S.

While the focus is adjusted using the pupil dividing method, the lens unit 110 may move the location of the focus at a high rate of speed. The camera 100 moves the location of the focus from number 11 to number 5, passing through 4 frames. Since the pupil dividing method does not require the process of calculating contrast while moving the location of the focus, the camera 100 may pick up an image to be displayed on the display unit 140 and then move the location of the focus of the lens unit 110. Accordingly, the camera 100 may move the location of the focus of the lens unit 110 from number 11 to number 5 at a high rate of speed.

Subsequently, the camera 100 may adjust a focus minutely using the contrast method. The camera 100 picks up an image at number 5, number 4, number 3, and number 2 and calculates a contrast value. Even though the highest contrast value is detected at number 4, the value may be compared with other surrounding values to be ultimately determined as the highest value. Therefore, the camera 100 moves two steps further from the location where the highest contrast value is detected and calculates two more contrast values. The camera 100 ultimately determines the location of number 4 as the location of on-focus and moves the location of the focus of the lens unit 110 to number 4.

Figure 4:
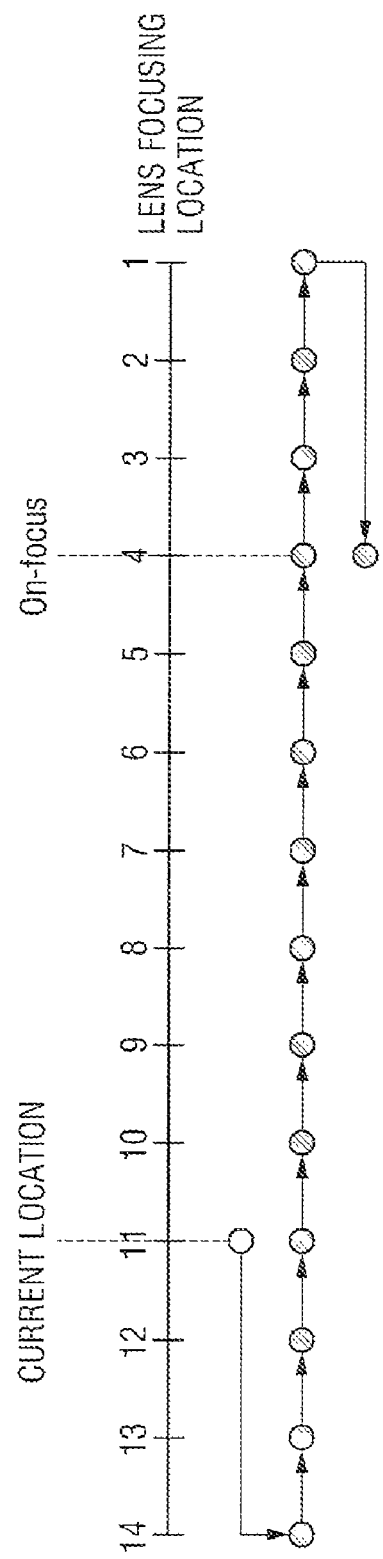
FIG. 4 is a view illustrating a focus adjusting path of a lens unit when only a contrast method is used according to an embodiment of the invention.

An example of a method for adjusting a focus using only the contrast method will be explained with reference to FIG. 4. FIG. 4 is a view illustrating a focus adjusting path of the lens unit 110 when only a contrast method is used according to an embodiment of the invention.

As illustrated in FIG. 4, the location of the current focus of the lens unit 110 is number 11, and the location of on-focus (that is, location in focus) is number 4. If a user presses a shutter button, the camera 100 performs auto-focusing using the contrast method.

When the contrast method is used, the camera 100 moves the lens unit 110 as far as number 14 and repeats the process of picking up an image and calculating contrast at each location from number 14 to number 1. Subsequently, the camera 100 determines the location of number 4 which has the highest contrast value as the location of on-focus and moves the location of the focus of the lens unit 110 to number 4.

In FIG. 3, the camera 100 adjusts a focus after performing image pick-up eight times and calculating contrast four times, but in FIG. 4, the camera adjusts a focus after performing image pick-up 14 times and calculating contrast 14 times. Accordingly, it can be seen that it may take less time to adjust a focus when the camera 100 uses both the pupil dividing method and the contrast method as illustrated in FIG. 3.

Figure 5:
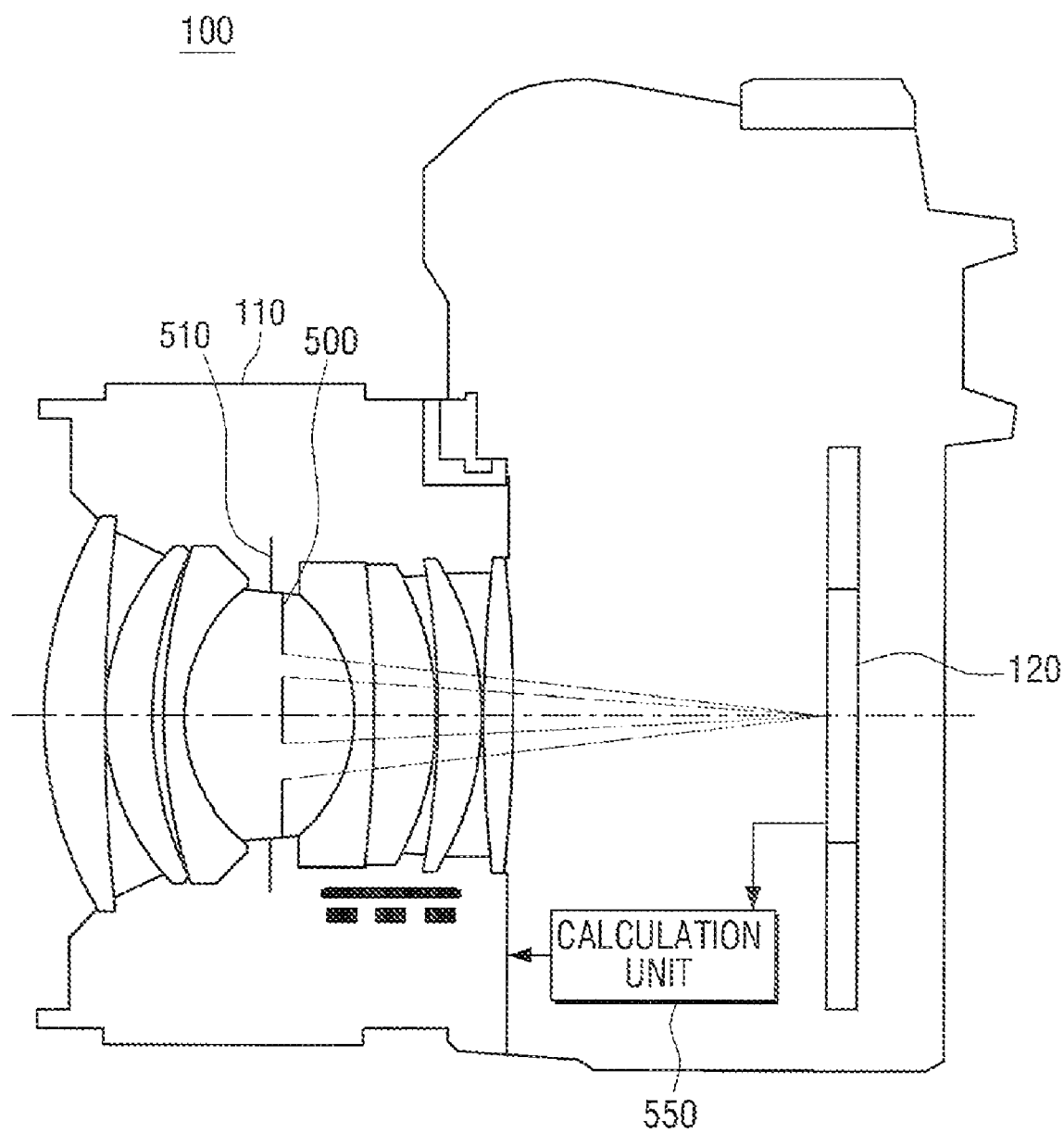
FIG. 5 is a view illustrating a configuration of a camera having an auto-focusing function of a pupil dividing method according to an embodiment of the invention.

A method for dividing a pencil of light lay using two apertures from among the pupil dividing method will be explained with reference to FIG. 5 to FIG. 10B. FIG. 5 is a view illustrating a configuration of the camera 100 having an auto-focusing function of a pupil dividing method according to an embodiment of the invention.

As illustrated in FIG. 5, the camera 100 may comprise a pupil dividing unit 500, an iris 510, a lens unit 110, an image pick-up unit 120, and a calculation unit 550. The pupil dividing auto-focusing unit 170 may include the pupil dividing unit 500 and the calculation unit 550.

The pupil dividing unit 500 may divide a pencil of light ray entering through the lens unit 110 into two pencils of light ray. To do so, the pupil dividing unit 500 may include two apertures having a different size from each other. The apertures pass two pencils of light ray having a different size from each other from among pencils of light ray entering through the lens unit 110. The pupil dividing unit 500 may divide a pencil of light ray entering through the lens unit 110 when the camera 100 performs auto-focusing. In other cases, the pupil dividing unit 500 may be disposed not to block a pencil of light ray entering through the lens unit 110.

The pupil dividing unit 500 may be driven by the same driving source as the light adjustment apparatus of a camera. For example, if the pupil dividing unit 500 is disposed in the iris 510 as illustrated in FIG. 5, the pupil dividing unit 500 is driven by the same driving source as the iris 510. While auto-focusing is performed, the driving source (not shown) of the pupil dividing unit 500 may drive the pupil diving unit 500 to block a pencil of light ray passing through the lens unit 110, and while auto-focusing is not performed, the driving source (not shown) of the pupil dividing unit 500 may drive the pupil diving unit 500 not to block a pencil of light ray passing through the lens unit 110.

The pupil dividing unit 500 may be disposed along with or integrally with the light adjustment apparatus of the camera 100. For example, the pupil dividing unit 500 may be integrally disposed in the iris 510 of the camera 100, which will be explained in detail with reference to FIGS. 10A and 10B. Alternatively, the pupil dividing unit 500 may be integrally disposed in the shutter (not shown) of the camera 100, which will be explained in detail with reference to FIGS. 9A to 9C. The pupil dividing unit 500 may also be disposed together with an ND filter (not shown) of the camera 100, which will be explained in detail with reference to FIGS. 7A to 7C.

The iris 510 may serve as the passage for an incident light and, with an adjustment of its size, may adjust the amount of incident light. The iris 510 may be disposed between lenses and allow an image to be formed in a lens. A virtual image of the iris 510 which is formed by a lens disposed in the front (between a subject and the iris) of the iris 510 is referred to as an entrance pupil, and a virtual image of the iris 510 which is formed by a lens disposed in the back (between the iris and an image pick-up area) of the iris 510 is referred to as an exit pupil. The exit pupil may affect the brightness of a picture.

The lens unit 110 may collect light from a subject and form an image on the image capturing unit 120. The lens unit 110 may include a plurality of lenses forming an optical group according to their respective functions. The lens unit 110 may include the driving unit 180. The driving unit 180 may receive auto-focusing information from the calculation unit 550 and may drive the lens unit into focus based on the auto-focusing information. The lens unit 110 may include the iris 510 which may adjust the amount of light passing through the photographing lens 110 and the depth of the image. For example, when the iris 510 is open wider, more light is allowed to pass through the lens unit 110, resulting in a brighter picture. However, as the diameter of the iris 510 becomes wider, the depth of the resulting picture may be low. On the other hand, when the iris 510 is narrowed, a darker picture may be obtained since a lesser amount of light is allowed to pass through the photographing lens 110, and as the iris diameter decreases, the depth of the resulting picture may be high.

The image capturing unit 120 is where the image of a subject may be projected and sensed. In the case of a film camera, a film is laid on the image capturing unit 120. In the case of a digital camera, image sensors may be arranged on the image capturing unit 120. The image capturing unit 120 may also capture the images of a plurality of pencils of light ray received from the pupil dividing unit 500 as the camera 100 performs auto-focusing. The image capturing unit 120 may capture the image of the subject entering through the lens unit 110 during a photographing operation, and may capture the images entering through the pupil dividing unit 500 during an auto-focusing operation. The driving source (not shown) of the pupil dividing unit 500 may drive the pupil dividing unit 500 such that the pupil dividing unit 500 blocks the pencil of light ray passing through the lens unit 110 during an auto-focusing operation. While the auto-focusing operation is not performed, the driving source may drive the pupil dividing unit 500 such that the pupil dividing unit 500 does not block the pencil of light ray passing through the lens unit 110.

With the above described configuration, the camera 100 may be capable of performing auto-focusing using the image capturing unit 120 without an extra sensor for auto-focusing.

The calculation unit 550 may calculate the state of focus based on the image data where a plurality of pencils of light ray passing through the pupil dividing unit 500 are captured and output by the image capturing unit 120. In this case, the calculation unit 550 may calculate the focusing state of the camera 100 using the phase difference detection method. The pencils of light ray passing through the two holes of the pupil dividing unit 500 form two images on the image capturing unit 120. Accordingly, the image data output by the image capturing unit 120 includes two overlapped images. The calculation unit 550 may calculate the deviation between the two images to detect the focusing state.

For example, suppose that the deviation between the two images is "a" (see FIG. 2B) and the deviation direction is x-axis. In this case, if the first image is f(x), the second image may be represented as D×f(x−a), where "D" refers to the aperture ratio of the two holes. The combined image of the two images becomes f(x)+D×f(x−a). If the combined image and the deviation "a" are given, the uncombined original image f(x) may be calculated using the above operation. In this case, if the deviation "a" is a correct value, the extracted image f(x) may be a correct image. However, if "a" is an incorrect value, the extracted image f(x) may also be an incorrect image. Through the above-described process, the calculation unit 550 may calculate the focusing state. The calculation unit 550 may also find the condition where the image f(x) is most similar to the real image, and may estimate the deviation "a" under that condition.

The calculation unit 550 may also calculate a focusing direction according to the relative locations and amount of light of two images which are formed on the image capturing unit 120 after passing through the two holes of the pupil dividing unit 500. This will be explained in detail with reference to FIG. 7.

The calculation unit 550 may output an auto-focusing detection signal to the controlling unit 190 to adjust a focus based on the calculated focusing state. Subsequently, the controlling unit 190 may generate a driving signal corresponding to the auto-focusing detection signal and output the generated driving signal to the driving unit 180. Then, the driving unit 180 may drive the lens unit 110 to move the lens to an in-focus position, thereby performing the auto-focusing operation of the camera 100.

Figure 6:
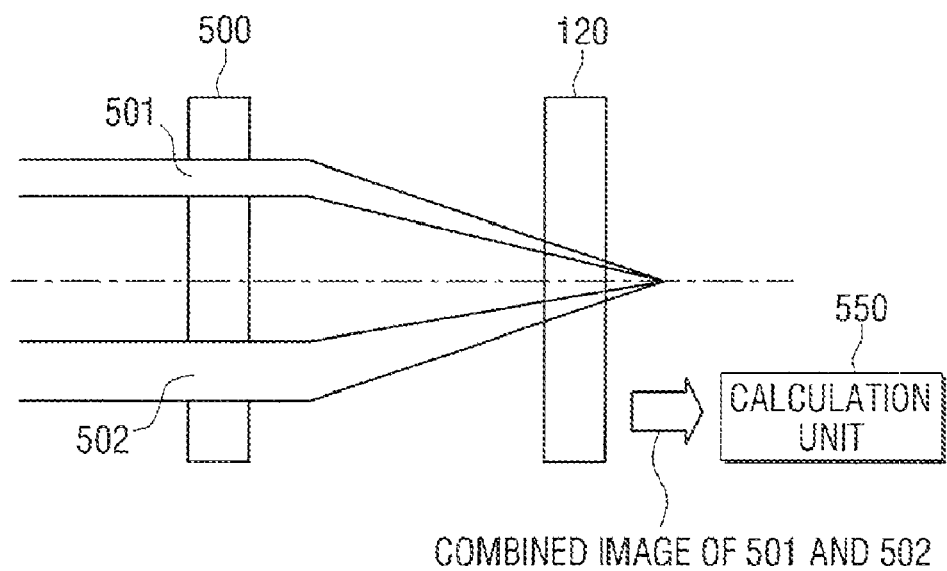
FIG. 6 is a view illustrating a configuration of an auto-focusing unit of an pupil dividing method according to an embodiment of the invention.

The pupil dividing auto-focusing unit 170 will be explained in detail with reference to FIGS. 6 and 7. FIG. 6 is a view illustrating the configuration of the pupil dividing auto-focusing unit 170 according to an embodiment of the invention.

As illustrated in FIG. 6, the pupil dividing auto-focusing unit 170 may comprise the pupil dividing unit 500 and the calculation unit 550. The pupil dividing unit 500 may include the first hole 501 and the second hole 502. The incident light may be divided by the first hole 501 and the second hole 502 of the pupil dividing unit 500. A combined image of the two pencils of light ray passing through the first hole 501 and the second hole 502 may be formed on the image capturing unit 120, and the image capturing unit 120 may output the image data of the combined image to the calculation unit 550. Other functions may be similar to those already described with reference to FIG. 5.

Figure 7:
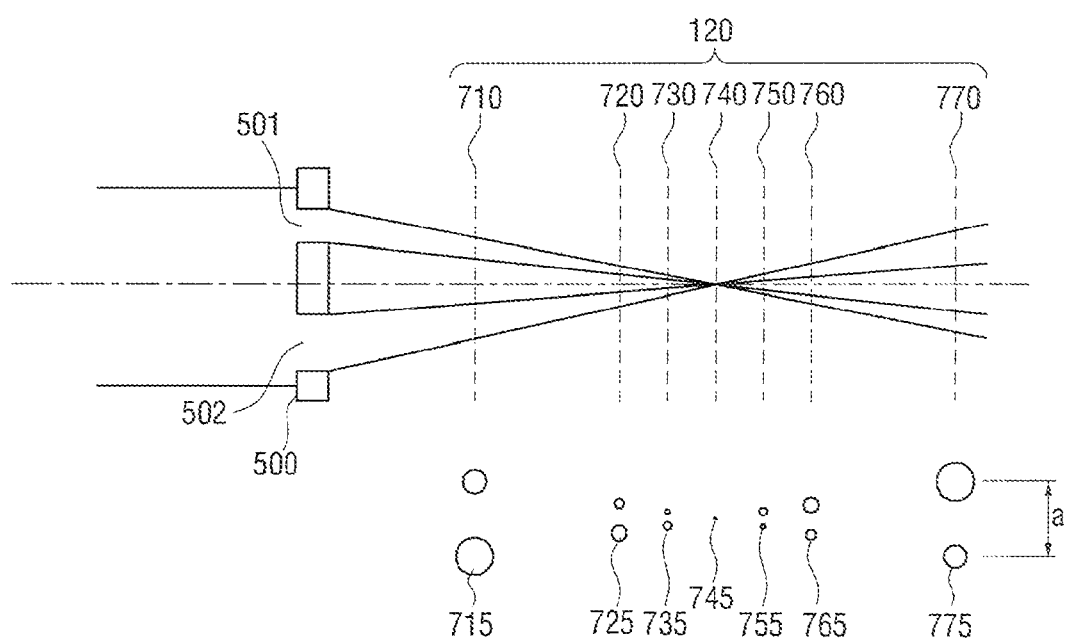
FIG. 7 is a view comparing images formed differently according to a location of an image capturing unit according to an embodiment of the invention.

FIG. 7 is a view comparing images formed differently according to a location of the image capturing unit 120 according to an embodiment of the invention. Although the lens unit 110 may actually move, images formed differently according to a location of the image capturing unit 120 will be explained in FIG. 7 for convenience of explanation. The pupil dividing unit 500 in FIG. 7 may include the first hole 501 and the second hole 502 and the second hole 502 may be larger than the first hole 501.

As illustrated in FIG. 7, if the image capturing unit 120 is located in a first position 710, a first image 715 may be formed on the image capturing unit 120. If the image capturing unit 120 is located in a second position 720, a second image 725 may be formed on the image capturing unit 120. If the image capturing unit 120 is located in a third position 730, a third image 735 may be formed on the image capturing unit 120.

The first position 710, the second position 720 and the third position 730 may be located in front of a focal plane 740. The first image 715, the second image 725 and the third image 735 may be located such that the larger image (the image of the pencil of light ray passing through the second hole 502) is formed below the smaller image. As such, if the image of the pencil of light ray passing through the first hole 501 and the image of the pencil of light ray passing through the second hole 502 are formed on the image capturing unit 120 in the same position as the first hole 501 and the second hole 502 of the pupil dividing unit 500, it can be seen that the image capturing unit 120 is located in front of the focal plane 740.

If the image capturing unit 120 is located in a fourth position, that is, in the focal plane 740, the image may be in focus, and may be represented as a dot, as seen in a fourth image 745.

As illustrated in FIG. 7, if the image capturing unit 120 is located in a fifth position 750, a fifth image 755 may be formed on the image capturing unit 120. If the image capturing unit 120 is located at a sixth position 760, a sixth image 765 may be formed on the image capturing unit 120. If the image capturing unit 120 is located at a seventh position 770, a seventh image 775 may be formed on the image capturing unit 120.

The fifth position 750, the sixth position 760, and the seventh position 770 may be located behind the focal plane 740. The fifth image 755, the sixth image 765 and the seventh image 775 may be located such that the larger image (the image of the pencil of light ray passing through the second hole 502) is positioned above the smaller image. If the image of the pencil of light ray passing through the first hole 501 and the image of the pencil of light ray passing through the second hole 502 are formed on the image capturing unit 120 in a reverse position of the first hole 510 and second hole 502 of the pupil dividing unit 500, it can be seen that the image capturing unit 120 is located behind the focal plane 740.

As the second hole 502 is larger than the first hole 501, the amount of light passing through the second hole 502 is larger than that passing through the first hole 501. Accordingly, whether the image capturing unit 120 is located in front of the focal plane 740 or behind the focal plane 740 may be determined based on the relative location of the image with greater amount of light in relation to the other one of the two images formed on the image capturing unit 120.

The calculation unit 550 may also determine by detecting the relative location of the image with greater amount of light in relation to the other one of the two images formed on the image capturing unit 120. As such, the calculation unit 550 may determine a current focusing status and a focusing direction using the difference in size of the first hole 501 and the second hole 502.

The calculation unit 550 may further determine how far the image capturing unit 120 is away from the focal plane 740 using the deviation "a" between the two images. The greater the deviation "a", the farther the distance between the image capturing unit 120 and the focal plane 740. Accordingly, the calculation unit 550 may determine the distance between the image capturing unit 120 and the focal plane 740 based on the deviation "a" by applying an appropriate function to the deviation "a". As such, the calculation unit 550 may calculate the focusing direction and the degree of defocus based on the deviation between the two images formed on the image capturing unit 120 and the respective locations of the two images. The degree of defocus corresponds to the distance between the image capturing unit 120 and the focal surface 740.

As described above, the camera 100 may perform pupil dividing auto-focusing using the pupil dividing unit 550, the image capturing unit 120, and the calculation unit 550 mounted on a light adjusting apparatus without an additional auto-focusing apparatus.

An example of the pupil dividing unit 500 mounted on a light adjusting apparatus will be explained with reference to FIGS. 8A to 10B.

Figure 8A:
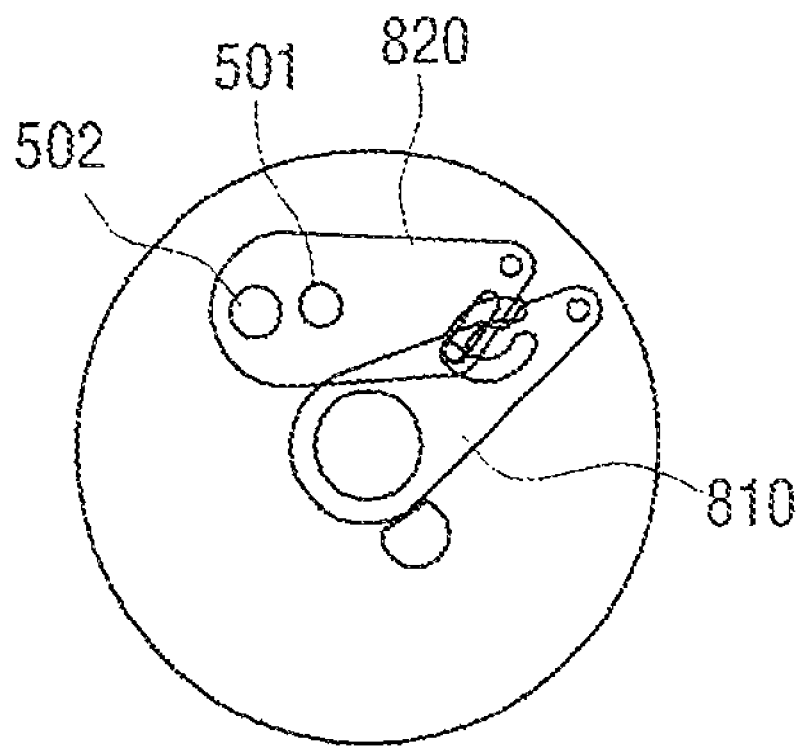
FIGS. 8A to 8C are views illustrating a pupil dividing unit mounted with a neutral density (ND) filter according to an embodiment of the invention.
Figure 8B:
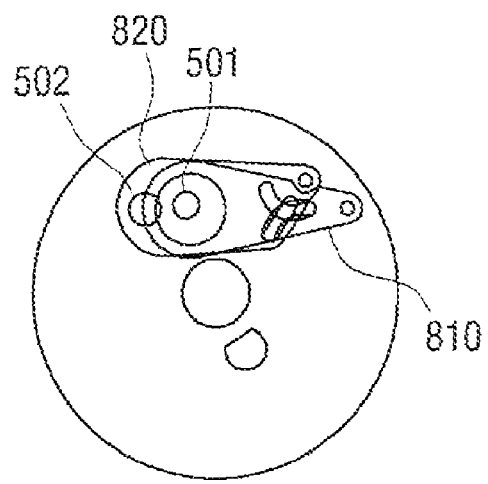
Figure 8C:
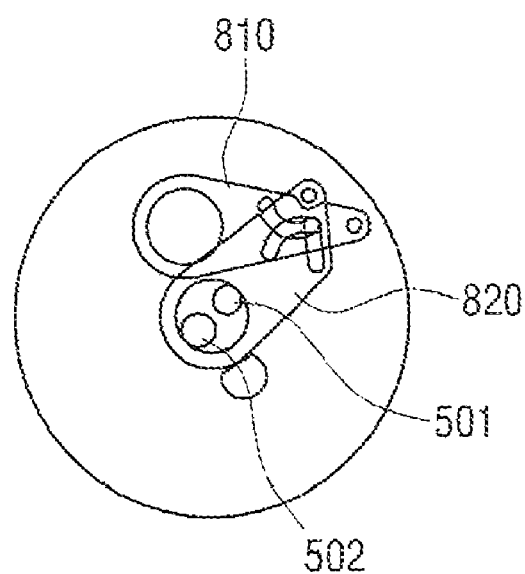

FIGS. 8A to 8C are views illustrating a pupil dividing unit 820 mounted with a neutral density (ND) filter 810 according to an embodiment of the invention.

The ND filter 810 may be a lens filter that is used to lower the brightness of the photographed scene. The ND filter 810 may reduce the amount of incident light uniformly throughout a wide wavelength band. If an iris alone is not enough to adjust brightness to a desired level, for example, because the subject is too bright, an ND filter 810 may be used to further adjust the brightness without changing the depth of the picture.

In FIGS. 8A to 8C, it can be seen that the pupil dividing unit 820 may include the first hole 501 and the second hole 502 and the pupil dividing unit 820 may be arranged along with the ND filter 810. The pupil dividing unit 820 and the ND filter 810 may be driven by the same driving source. The driving source may drive the pupil dividing unit 820 and the ND filter 810 such they are disposed in one of the positions illustrated in FIGS. 8A to 8C depending on circumstances.

FIG. 8A is a view illustrating a state where the ND filter 810 is used during a photographing operation. As illustrated in FIG. 8A, the ND filter 810 is located in an optical path while the ND filter 810 is in use and the pupil dividing unit 820 is upwardly disposed, away from the light path.

FIG. 8B is a view illustrating a state where none of the ND filter 810 and the pupil dividing unit 820 are in use. As illustrated in FIG. 8B, both the ND filter 810 and the pupil dividing unit 820 are upwardly disposed, away from the optical path while none of the ND filter 810 and the pupil dividing unit 820 are in use.

FIG. 8C is a view illustrating a state where the pupil dividing unit 820 is in use while the camera performs auto-focusing. As illustrated in FIG. 8C, the pupil dividing unit 820 is disposed such that the first hole 501 and the second hole 502 are located on the optical path during auto-focusing operation.

Figure 9A:
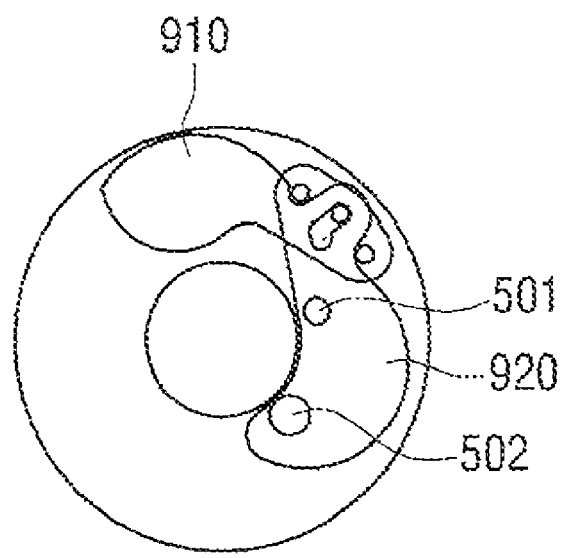
FIGS. 9A to 9C are views illustrating a shutter in which a pupil dividing unit is integrally disposed according to an embodiment of the invention.
Figure 9B:
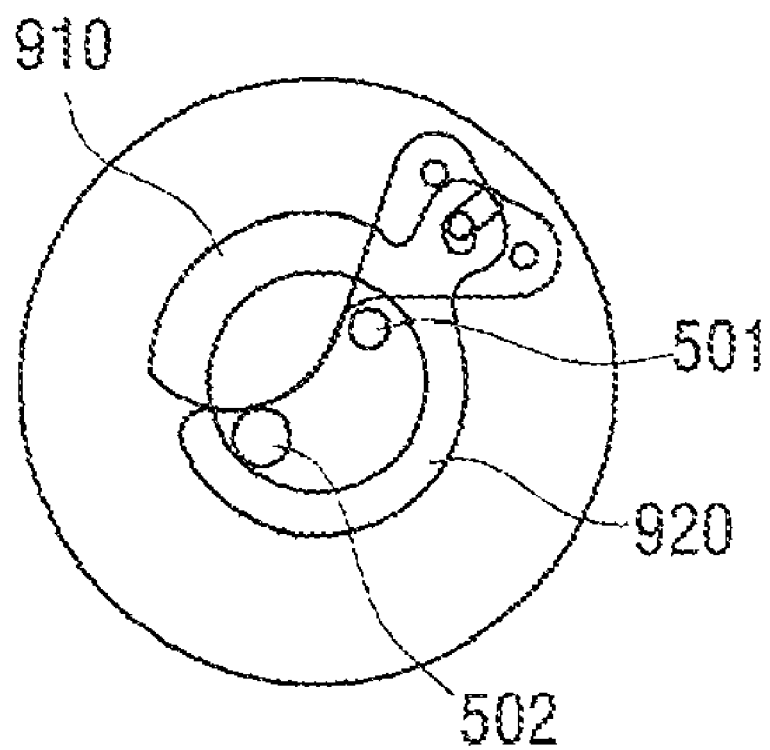
Figure 9C:
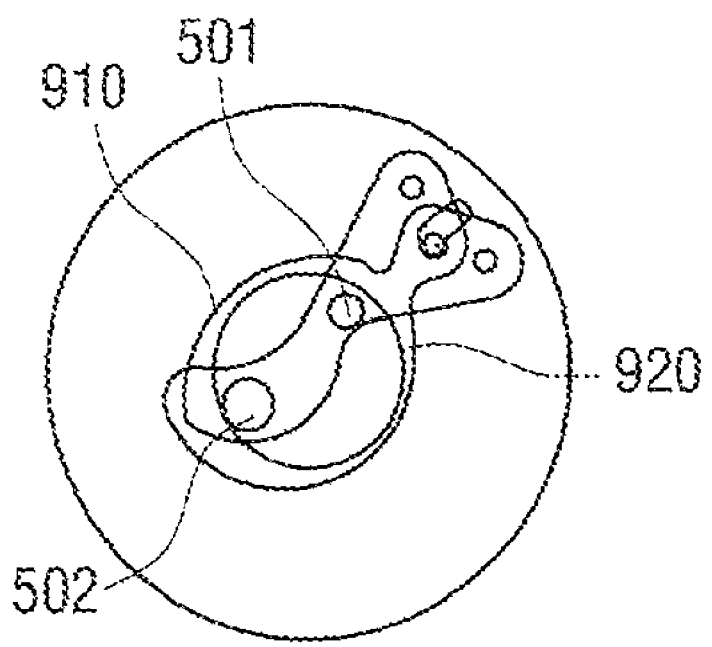

FIGS. 9A to 9C are views illustrating a shutter in which a pupil dividing unit is integrally disposed according to an embodiment of the invention. As illustrated in FIGS. 9A to 9C, the first hole 501 and the second hole 502 corresponding to the pupil dividing unit may be integrally formed with the lens shutter. The lens shutter may include a first shutter wing 910 and a second shutter wing 920, and the first hole 501 and the second hole 502 may be formed on the second shutter wing 920. The pupil dividing unit may be driven by the driving source for the lens shutter. The driving source may drive the first shutter wing 910 and the second shutter wing 920 such that the lens shutter is disposed in one of positions illustrated in FIGS. 9A to 9C depending on circumstances.

FIG. 9A is a view illustrating a shutter open state in which the shutter is open for the purpose of photographing. As illustrated in FIG. 9A, both the first and second shutter wings 910 and 920 may be positioned away from the optical path so as to maintain shutter in the open state.

FIG. 9B is a view illustrating the pupil dividing state of the lens shutter during an auto-focusing operation. As illustrated in FIG. 9B, the first shutter wing 910 and the second shutter wing 920 may be intertwined with each other to maintain the shutter in a close state. However, the second shutter wing 920 may be disposed such that the first hole 501 and the second hole 502 are positioned in the optical path and thus, incident light passes through the first hole 501 and the second hole 502. When the first and shutter wings 910 and 920 positioned in the above manner, the lens shutter may perform the function of the pupil dividing unit 500 as well.

FIG. 9C is a view illustrating a state where the shutter is completely closed. As illustrated in FIG. 9C, the first and second shutter wings 910 and 920 may be completely intertwined with each other such that the first hole 501 and the second hole 502 are completed closed. In the above state, the optical path is completed blocked, placing the camera 100 in the shutter close state.

As described above, the lens shutter may be in the shutter open state, in the pupil dividing state, or in the shutter close state. Therefore, the pupil dividing unit 500 may be integrally formed with the lens shutter and driven accordingly.

Figure 10A:
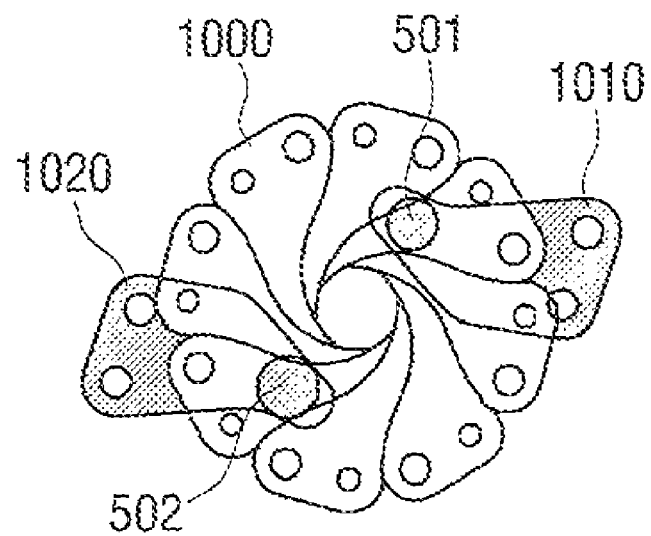
FIGS. 10A and 10B are views illustrating an iris in which a pupil dividing unit is integrally disposed according to an embodiment of the invention.
Figure 10B:
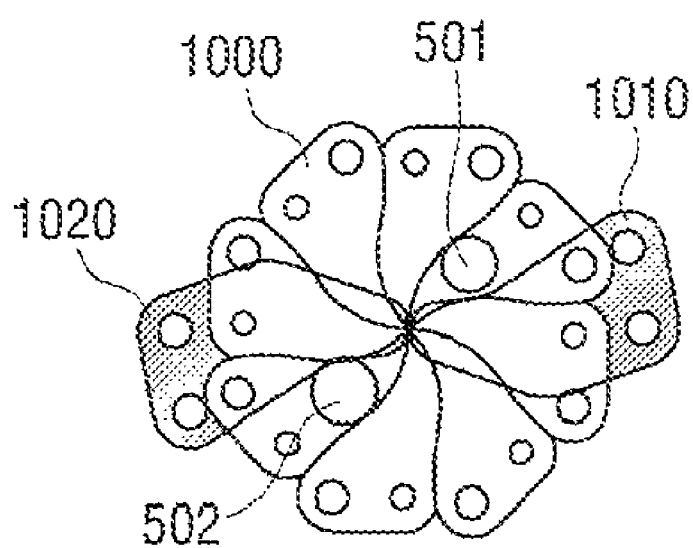

FIGS. 10A and 10B are views illustrating an iris in which a pupil dividing unit is integrally disposed according to an embodiment of the invention. FIG. 10A is a view illustrating an iris 1000 in which the pupil dividing unit is integrally disposed according to an embodiment of the invention. In FIG. 10A, it can be seen that the first hole 501 and the second hole 502, which correspond to a pupil dividing unit, may be integrally formed with the iris 1000. As illustrated in FIG. 10A, the iris 1000 may include a first screen 1010 and a second screen 1020, and the first hole 501 and the second hole 502 may be blocked by the first screen 1010 and the second screen 1020 respectively.

In FIG. 10A, the first screen 1010 and the second screen 1020 are driven by the same driving source of the iris 1000. The driving source may drive the iris 1000, the first screen 1010, and the second screen 1020 so that the iris 1000, the first screen 1010, and the second screen 1020 are disposed in one of positions illustrated in FIGS. 10A and 10B depending on circumstances.

FIG. 10A is a view illustrating a status of the iris 100 which is used for photographing. As illustrated in FIG. 10A, the first screen 1010 and the second screen 1020 may be disposed so as to block the first hole 501 and the second hole 502 to keep the state where only the iris 100 is in use.

FIG. 10B is a view illustrating a state where the iris 100 is in a pupil dividing status to perform auto-focusing. As illustrated in FIG. 10B, the first screen 1010 and the second screen 1020 may be disposed so as not to block the first hole 501 and the second hole 502, and the iris 100 is in a close state. In this case, incident light passes through the first hole 501 and the second hole 502. As such, the iris 1000, the first screen 1010, and the second screen 1020 are disposed so that the iris 1000 may perform the function of the pupil dividing unit 500 as well.

As described above, the iris 1000 may be in a use state or in a pupil dividing state. Therefore, the pupil dividing unit 500 may be integrally formed with the iris and driven accordingly.

As described above with reference to FIGS. 8A to 10B, the pupil dividing unit 500 may be arranged along with or formed integrally with the ND filter, the shutter, and the iris. Accordingly, the camera 100 may perform auto-focusing in the pupil dividing method without an additional auto-focusing apparatus.

In some embodiments, the pupil dividing unit 500 has two holes, but this is only an example. The pupil dividing unit 500 may have more than two holes. In this case, the image capturing unit 120 may photograph a plurality of pencils of light ray which are divided by the pupil dividing unit 500 during a focusing operation. The calculation unit 550 may calculate a focusing status based on combined image data which is created as a plurality of pencils of light ray passing through the pupil dividing unit 550 are photographed and output by the image capturing unit 120. In addition, the calculation unit 550 may calculate a focusing direction based on the amount of the plurality of pencils of light ray passing through a plurality of holes in different sizes.

In some embodiments, the camera may be any apparatus capable of performing auto-focusing using two methods. For example, the camera may be a compact camera, a video camera, and so forth.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A camera, comprising:
    a first auto-focusing unit which performs auto-focusing a first method;
    a second auto-focusing unit which performs auto-focusing a second method; and
    a controlling unit which, if specific conditions are satisfied, controls a focus using both the first auto-focusing unit and the second auto-focusing unit,
    wherein the specific conditions include a condition in which an amount of incident light is above a specified amount of light.

2. The camera as claimed in claim 1, wherein the controlling unit, if specific conditions are satisfied, adjusts a focus to be within a specific range using the first auto-focusing unit and minutely adjusts a focus using the second auto-focusing unit.

3. The camera as claimed in claim 2, wherein the specific range is a range where an amount of defocus is below a specified amount of defocus.

4. The camera as claimed in claim 1, wherein a speed of performing auto-focusing of the first auto-focusing unit is faster than that of the second auto-focusing unit.

5. The camera as claimed in claim 1, wherein the second auto-focusing unit adjusts a focus using a contrast AF method.

6. The camera as claimed in claim 1, wherein the controlling unit, if the specific conditions are not satisfied, adjusts a focus using only the second auto-focusing unit.

7. The camera as claimed in claim 1, wherein the specific conditions include a condition in which an angle of view is below a specified angle of view.

8. A method for performing auto-focusing, comprising:
    determining whether specific conditions are satisfied; and
    if specific conditions are satisfied, adjusting a focus using both a first auto-focusing method and a second auto-focusing method,
    wherein the specific conditions include a condition in which an amount of incident light is above a specified amount of light.

9. The method as claimed in claim 8, wherein the adjusting further includes:

if the specific conditions are satisfied, adjusting a focus to be within a specific range using the first auto-focusing method; and after a focus is adjusted to be within the specific range, minutely adjusting a focus using the second auto-focusing method.

10. The method as claimed in claim 9, wherein the specific range is a range where an amount of defocus is below a specified amount of defocus.

11. The method as claimed in claim 8, wherein a speed of performing auto-focusing of the first auto-focusing method is faster than that of the second auto-focusing method.

12. The method as claimed in claim 8, wherein the second auto-focusing method is a contrast AF method.

13. The method as claimed in claim 8, further comprising:
if the specific conditions are not satisfied, adjusting a focus using the second auto-focusing method.

14. The method as claimed in claim 8, wherein the specific conditions include a condition in which an angle of view is below a specified angle of view.

15. The camera as claimed in claim 1, wherein the first auto-focusing unit divides a pencil of light ray entering through a photographing lens into a plurality of pencils of light ray using a plurality of holes, and adjusts a focus using a pupil dividing method which adjusts a focus using the divided plurality of pencils of light ray.

16. The method as claimed in claim 8, where the first auto-focusing method divides a pencil of light ray entering through a photographing lens into a plurality of pencils of light ray using a plurality of holes, and is a pupil dividing method which adjusts a focus using the divided plurality of pencils of light ray.

17. The camera as claimed in claim 1, wherein the first auto-focusing unit divides a pencil of light ray entering through a photographing lens into two pencils of light ray using two holes, and adjusts a focus using a pupil dividing method which adjusts a focus using the divided two pencils of light ray.

18. The method as claimed in claim 8, wherein the first auto-focusing method divides a pencil of light ray entering through a photographing lens into two pencils of light ray using two holes, and is a pupil dividing method which adjusts a focus using the divided two pencils of light ray.

* * * * *